(12) United States Patent
Khatravath et al.

(10) Patent No.: US 10,579,949 B2
(45) Date of Patent: Mar. 3, 2020

(54) METHODS AND SYSTEMS FOR FACILITATING TRANSPORTATION OF ARTICLES IN WAREHOUSES USING VIDEO ANALYTICS

(71) Applicant: Wipro Limited, Bangalore (IN)

(72) Inventors: Sreevidya Khatravath, Hyderabad (IN); Sumanta Laha, Begampur (IN)

(73) Assignee: Wipro Limited, Bangalore (IN)

( * ) Notice: Subject to any disclaimer, the term of this patent is extended or adjusted under 35 U.S.C. 154(b) by 509 days.

(21) Appl. No.: 15/363,851

(22) Filed: Nov. 29, 2016

(65) Prior Publication Data

US 2018/0137452 A1 May 17, 2018

(30) Foreign Application Priority Data

Nov. 16, 2016 (IN) .............................. 201641039113

(51) Int. Cl.
*G06Q 10/06* (2012.01)
*G06K 9/00* (2006.01)
(Continued)

(52) U.S. Cl.
CPC ... *G06Q 10/063114* (2013.01); *G06K 9/0063* (2013.01); *G06Q 10/00* (2013.01); *G06Q 10/06313* (2013.01); *G06Q 10/08* (2013.01)

(58) Field of Classification Search
CPC .............................. G06Q 10/00; G06Q 30/02
(Continued)

(56) References Cited

U.S. PATENT DOCUMENTS 7,038,573 B2 * 5/2006 Bann ..................... B66F 9/0755
340/10.1
7,243,001 B2 * 7/2007 Janert ..................... G06Q 10/08
700/213

(Continued)

FOREIGN PATENT DOCUMENTS

WO 2008140293 A1 11/2008
WO 2016009423 A1 1/2016

OTHER PUBLICATIONS

"Optimizing Warehouse Forklift Dispatching Using a Sensor Network and Stochastic Learning", Journal, Jul. 22, 2011, pp. 1-11, vol. 7—Issue 3, IEEE.

*Primary Examiner* — Robert D Rines
(74) *Attorney, Agent, or Firm* — Pepper Hamilton LLP

(57) ABSTRACT

Methods and systems for facilitating transportation of articles in a warehouse are disclosed. The method includes extracting employee information associated with a plurality of employees, vehicle information associated with a plurality of vehicles used in the warehouse, and a warehouse layout map. The method further includes analyzing camera feeds captured using a plurality of cameras installed within the warehouse to determine: current activity status of each of the plurality of employees, interaction of each of the plurality of employees with at least one of the plurality of vehicles, and current location of: the plurality of employees, the plurality of vehicles, and articles within the warehouse. The method also includes computing a task completion plan for transporting an article from an originating point to a destination point within the warehouse based on: the employee information, the vehicle information, the warehouse layout map, and analysis of the camera feeds.

19 Claims, 5 Drawing Sheets

(51) Int. Cl.
*G06Q 10/08* (2012.01)
*G06Q 10/00* (2012.01)

(58) Field of Classification Search
USPC .................................................. 705/7.11–7.42
See application file for complete search history.

(56) References Cited

U.S. PATENT DOCUMENTS

| | | | |
|---|---|---|---|
| 2007/0293978 A1* | 12/2007 | Wurman | G05B 19/4189 |
| | | | 700/213 |
| 2009/0043486 A1 | 2/2009 | Yang et al. | |
| 2014/0278029 A1* | 9/2014 | Tonguz | G08G 1/161 |
| | | | 701/117 |
| 2014/0324491 A1* | 10/2014 | Banks | G06Q 10/087 |
| | | | 705/7.12 |
| 2015/0227862 A1* | 8/2015 | Chandrasekar | G01C 21/206 |
| | | | 705/7.11 |
| 2015/0379715 A1* | 12/2015 | Chandrasekar | G06K 9/00664 |
| | | | 701/28 |
| 2016/0155003 A1 | 6/2016 | Venetianer et al. | |
| 2018/0107226 A1* | 4/2018 | Yang | G05D 1/0246 |

* cited by examiner

US 10,579,949 B2

METHODS AND SYSTEMS FOR FACILITATING TRANSPORTATION OF ARTICLES IN WAREHOUSES USING VIDEO ANALYTICS

This application claims the benefit of Indian Patent Application Serial No. 201641039113 filed Nov. 16, 2016, which is hereby incorporated by reference in its entirety.

FIELD

This disclosure relates generally to warehouse management and more particularly to methods and systems for facilitating transportation of articles in warehouses using video analytics.

BACKGROUND

For supply chain and logistics companies, optimization of logistics in warehouses results in significant reduction of wasteful expenditure. Moreover, it improves performance of these companies as far as logistics in the warehouses are concerned. This optimization may be enabled by proper monitoring of the logistics hubs and warehouses. However, currently most companies depend only on manual methods of monitoring the resources and cost optimization.

Some supply chain and logistics companies have made progress in automating transaction processing and data capture related to logistics warehouse operations. However, the methodologies used by these companies are not cost effective.

In some other supply chain and logistics companies, the optimization decisions are made based only on the analysis of point of interaction data extracted at various check points in a warehouse and the inventory of different products inside the warehouse. This analysis is based on manual survey data to capture the trend for performance improvement. Moreover, most of the warehouse tasks are manually scheduled and carried out with emphasizing or correlating tasks scheduled in warehouse. This further results in delays and leads to incurring additional costs due to use of more labor force to complete the scheduled tasks within a stipulated time.

SUMMARY

In one embodiment, a method for facilitating transportation of articles within a warehouse is disclosed. The method includes extracting, by a warehouse management device, employee information associated with a plurality of employees, vehicle information associated with a plurality of vehicles used in the warehouse, and a warehouse layout map; analyzing, by the warehouse management device, camera feeds captured using a plurality of cameras installed within the warehouse to determine: current activity status of each of the plurality of employees, interaction of each of the plurality of employees with at least one of the plurality of vehicles, and current location of: the plurality of employees, the plurality of vehicles, and articles within the warehouse; and computing, by the warehouse management device, a task completion plan for transporting an article from an originating point to a destination point within the warehouse based on: the employee information, the vehicle information, the warehouse layout map, and analysis of the camera feeds, wherein the task completion plan comprises combination of at least one employee of the plurality of employees, at least one vehicle of the plurality of vehicles, a path within the warehouse for transporting the article, and priority associated with transporting the article.

In another embodiment, a warehouse management device is disclosed. The warehouse management device includes at least one processor and a memory. The memory is communicatively coupled to the at least one processor, wherein the memory stores processor executable instructions, which, on execution, causes the at least one processor to: extract employee information associated with a plurality of employees, vehicle information associated with a plurality of vehicles used in the warehouse, and a warehouse layout map; analyze camera feeds captured using a plurality of cameras installed within the warehouse to determine: current activity status of each of the plurality of employees, interaction of each of the plurality of employees with at least one of the plurality of vehicles, and current location of: the plurality of employees, the plurality of vehicles, and articles within the warehouse; and compute a task completion plan for transporting an article from an originating point to a destination point within the warehouse based on: the employee information, the vehicle information, the warehouse layout map, and analysis of the camera feeds, wherein the task completion plan comprises combination of at least one employee of the plurality of employees, at least one vehicle of the plurality of vehicles, or a path within the warehouse for transporting the article, and priority associated with transporting the article.

In yet another embodiment, a non-transitory computer-readable storage medium having stored thereon, a set of processor-executable instructions for facilitating transportation of articles within a warehouse, that when executed by a processor cause the processor to perform operations comprising: extracting employee information associated with a plurality of employees, vehicle information associated with a plurality of vehicles used in the warehouse, and a warehouse layout map; analyzing camera feeds captured using a plurality of cameras installed within the warehouse to determine: current activity status of each of the plurality of employees, interaction of each of the plurality of employees with at least one of the plurality of vehicles, and current location of: the plurality of employees, the plurality of vehicles, and articles within the warehouse; and computing a task completion plan for transporting an article from an originating point to a destination point within the warehouse based on: the employee information, the vehicle information, the warehouse layout map, and analysis of the camera feeds, wherein the task completion plan comprises combination of at least one employee of the plurality of employees or at least one vehicle of the plurality of vehicles, a path within the warehouse for transporting the article, and priority associated with transporting the article.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
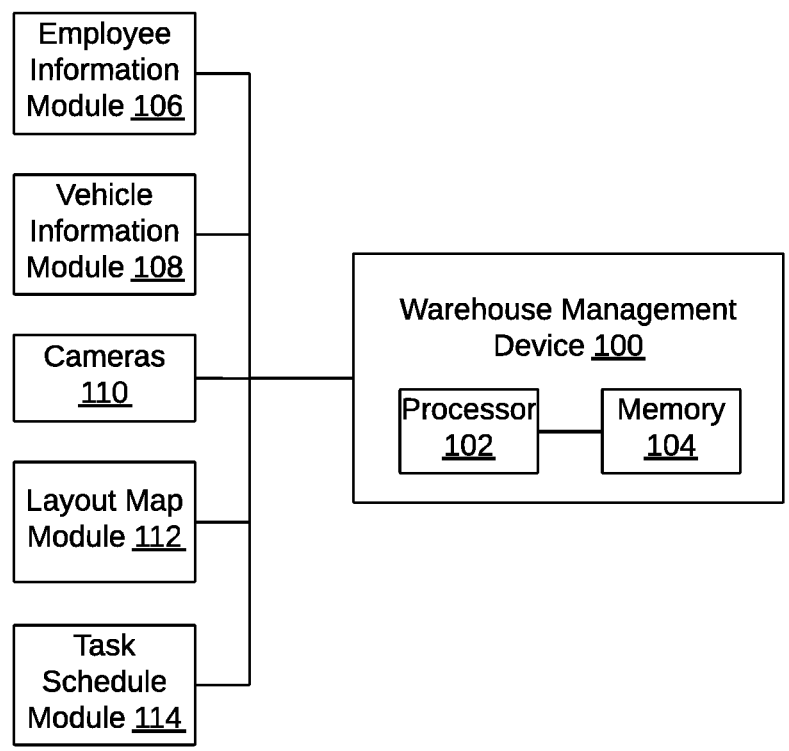
FIG. 1 is a block diagram illustrating a warehouse management device for facilitating transportation of articles within a warehouse, in accordance with an embodiment.

Additional illustrative embodiments are listed below. In one embodiment, a block diagram of a warehouse management device 100 for facilitating transportation of articles within a warehouse is disclosed in FIG. 1. Warehouse management device 100 includes a processor 102 and a memory 104. It will be apparent to a person skilled in the art that warehouse management device 100 may include more than one processor. Memory 104 is communicatively coupled to processor 102 and stores processor executable instructions that cause processor to perform the method for facilitation transportation of articles within a warehouse, which has been explained in detail in conjunction with FIGS. 3, 4, and 5. Examples of memory 104 may include, but are not limited to magnetic disc drive, magneto-optical drive, optical drive, redundant array of independent discs (RAID), solid-state memory devices, and solid-state drives. Warehouse management device 100 may be part of a warehouse management system.

Warehouse management device 100 is also communicatively coupled to an array of peripheral devices, for example, an employee information module 106, a vehicle information module 108, cameras 110 installed within the warehouse, a layout map module 112, and a task schedule module 114 through Remote Procedure Call (RPC), Application Program Interface (API) calls socket, or any other similar access mechanism. Warehouse management device 100 extracts employee information from employee information module 106, vehicle and equipment information from vehicle information module 108, camera feeds from cameras 110, a warehouse layout map from a layout map module 112, and a warehouse task schedule from task schedule module 114. Various types of information extracted from these modules are explained in detail in conjunction with FIGS. 3 and 4. The information thus extracted is processed by various modules in memory 104, which further instructs processor 102 to facilitate transportation of articles within the warehouse. Memory 104 is further explained in detail in conjunction with FIG. 2.

Figure 2:
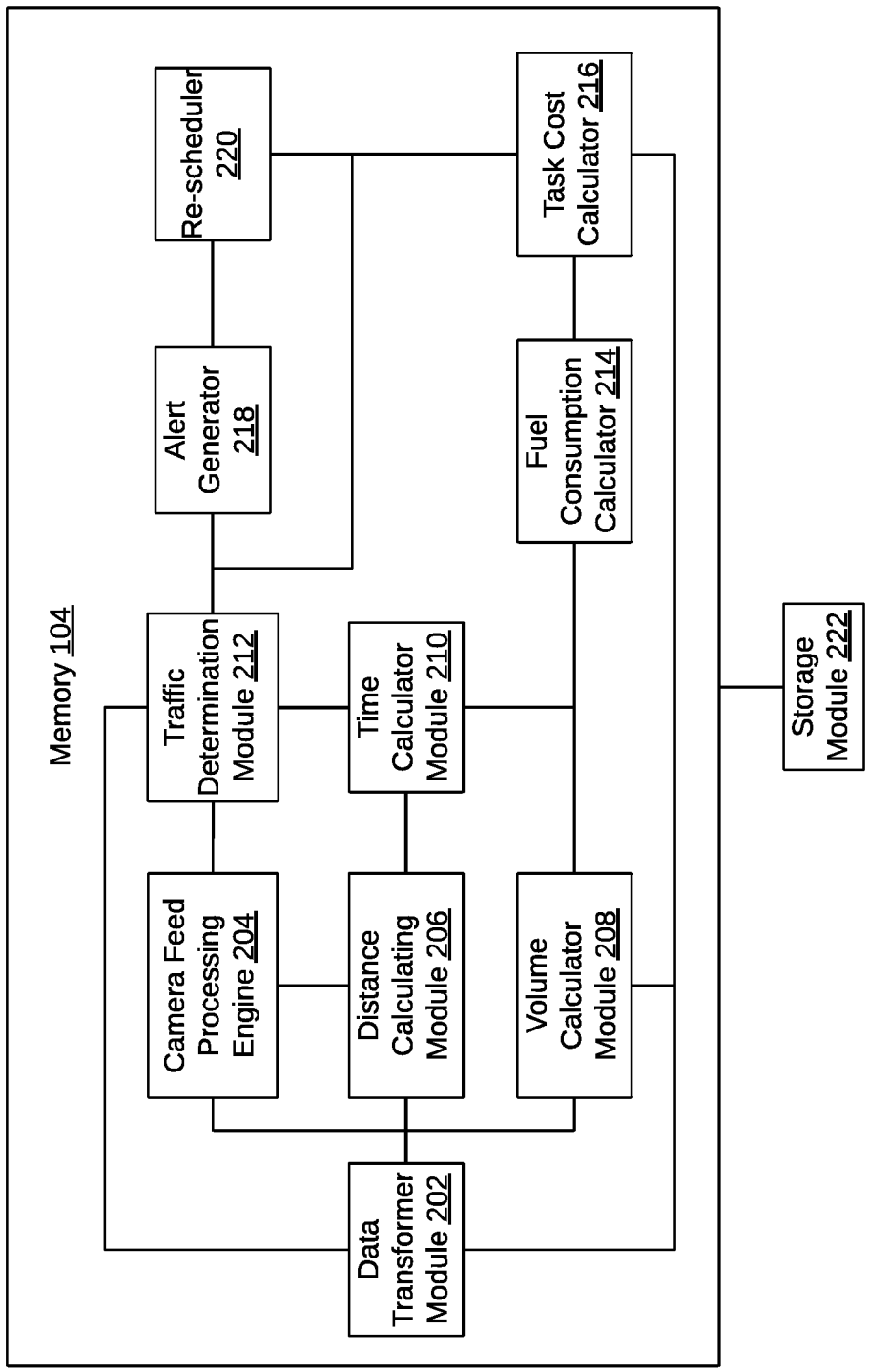
FIG. 2 is a block diagram illustrating various modules within a memory of the warehouse management device, in accordance with an embodiment.

Referring now to FIG. 2, a block diagram of various modules within a memory 104 of warehouse management device 100 is illustrated, in accordance with an embodiment. Various modules in memory 104 may communicate amongst each other using RPC, API calls Socket, or any other similar access mechanism.

The information extracted by warehouse management device 100 from employee information module 106, vehicle information module 108, cameras 110, layout map module 112, and task schedule module 114 is transformed into a common predefined format by a data transformer module 202. Thereafter, a camera feed processing engine 204 analyzes the camera feeds captured using cameras 110 to determine current activity status of each of the plurality of employees, interaction of each employee with one or more vehicles or equipment, and current location of: one or more employees, vehicles, and articles within the warehouse. This analysis is explained in detail in conjunction with FIG. 3.

The warehouse layout map and the analysis performed on the camera feeds by camera feed processing engine 204 is then used by a distance calculation module 206 to identify a plurality of paths for transporting an article from the originating point to the destination point. Thereafter, distance calculation module 206 computes actual distance for each of the plurality of paths by converting pixel data associated with the plurality of paths captured from the camera feeds. This is further explained in detail in conjunction with FIG. 4. Distance calculating module 206 communicates with data transformer module 202 and camera feed processing engine 204 through RPC, API calls, socket, or any other similar access mechanism.

After computing actual distance for each of the plurality of paths, a volume calculator module 208 communicates with data transformer module 202 to identify suitable employees and types of suitable vehicles for transporting the article. Volume calculator module 208 communicates with data transformer module 202 through RPC, API calls, Socket, or any other similar access mechanism. Thereafter, volume calculator module 208 computes costs associated with each of a plurality of volume combinations of the number of suitable employees, a type of suitable vehicle, total number of the type of suitable vehicles, and time required for operating the type of suitable vehicle by a suitable employee. Based on the computed costs, volume calculator module 208 identifies a volume combination from the plurality of volume combinations that has least cost. This is further explained in detail in conjunction with FIG. 4.

A time calculator module 210 then computes time required to transport the article from the originating point to the destination point for each of the plurality of paths based on: the actual distance computed for each of the plurality of paths, the areas within the warehouse experiencing modification in traffic flow, and the volume combination identified. This is further explained in detail in conjunction with FIG. 4. Time calculator module 210 communicates with distance calculating module 206 and volume calculator module 208 to compute the required time for the plurality of paths.

Time calculator module 210 also communicates with a traffic determination module 212 to extract information regarding the areas within the warehouse that are experiencing modification in traffic flow. This communication is enabled through RPC, API calls, Socket, or any other similar access mechanism. Modification in traffic flow may include creation of traffic congestion or clearing of traffic congestions. Modification in traffic flow is determined by traffic determination module 212 by retrieving relevant information from data transformer module 202 and camera feed processing engine 204. This is further explained in detail in conjunction with FIG. 4.

Thereafter, a fuel consumption calculator 214 computes fuel consumption associated with each of the plurality of paths based on the actual distance computed for each of the plurality of paths, time required to transport the article on each of the plurality of paths, and the vehicle combination identified. To this end, fuel consumption calculator 214 communicates with time calculator module 210 and volume calculator module 208 through RPC, API calls, Socket, or any other similar access mechanism. Fuel consumption calculator 214 then identifies the path from the plurality of paths that requires least fuel consumption to transport the article from the originating point to the destination point. This is further explained in detail in conjunction with FIG. 4.

A task cost calculator 216 then calculates the cost of transporting the article from the originating point to the destination point based on the cost computed for the volume combination identified, cost of fuel required to transport the article using the path, the employee information, and the vehicle information. To this end, task cost calculator 216 communicates with data transformer module 202, volume calculator module 208, and traffic determination module 212 through RPC, API calls, Socket, or any other similar access mechanism. This is further explained in detail in conjunction with FIG. 4.

In an embodiment, when traffic determination module 212 detects modification in traffic flow in real time by analyzing the live camera feeds captured by the plurality of cameras installed in the warehouse, traffic determination module 212 communicates with an alert generator 218 to generate alerts that include an indication regarding the areas that are experiencing modification in traffic flow.

Figure 4:
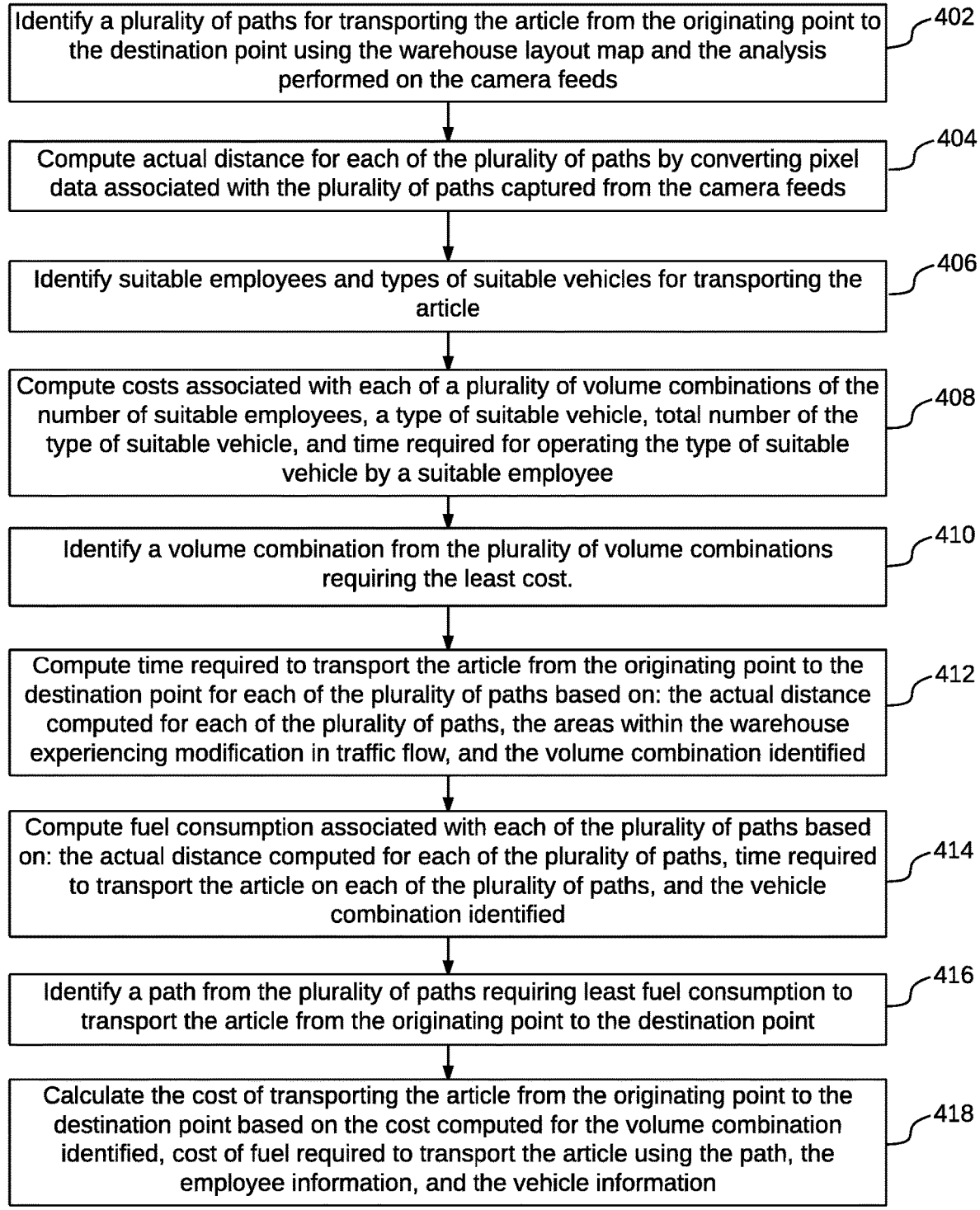
FIG. 4 illustrates a flowchart of a method for computing a task completion plan to transport an article within the warehouse, in accordance with an embodiment.

When a re-scheduler 220 receives these alerts, it reevaluates all task assigned to the areas identified in the alerts using the cost calculation method discussed in detail in FIG. 4. All these tasks may then be rescheduled to accommodate the modification in traffic flow. In other words, these tasks are assigned a different course of action depending on the wait time for traffic congestion to clear out. To this end, re-scheduler 220 communicates with task cost calculator 216 to modify the task completion plan based on the areas determined within the warehouse that are experiencing modification in traffic flow. This has been explained in detail in conjunction with FIGS. 4 and 5.

All the above information and actions used to compute the task completion plan and any subsequent modification of the task completion plan based on real-time information on traffic, is stored in a storage module 222, which is part of warehouse management device 100. The information thus stored in storage module 222 is used for computation of task completion plans in future. This enables incremental learning for warehouse management device 100.

Figure 3:
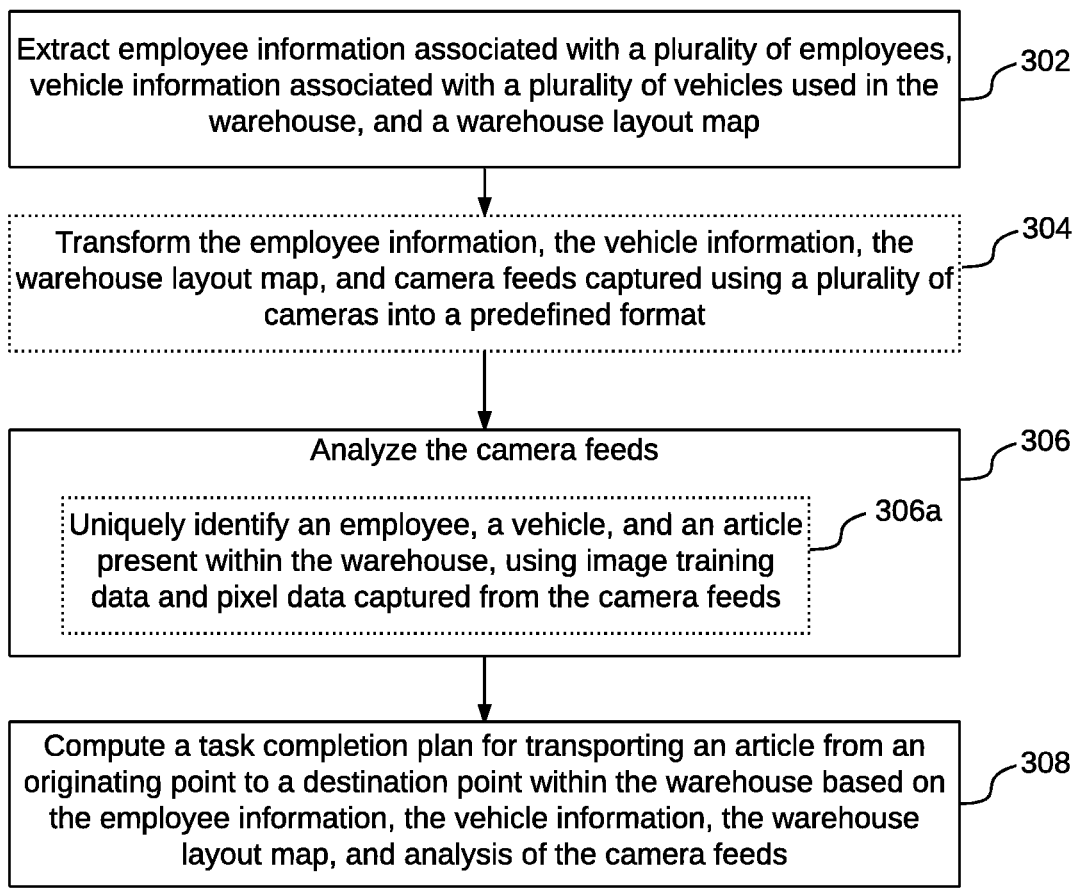
FIG. 3 illustrates a flowchart of a method for transporting articles in a warehouse, in accordance with an embodiment.

Referring now to FIG. 3, a flowchart of a method of transporting articles in a warehouse is illustrated, in accordance with an embodiment. To transport an article from an originating point to a destination point within the warehouse, at 302, a warehouse management device 100 extracts employee information associated with a plurality of employees, vehicle information associated with a plurality of vehicles and equipment used in the warehouse, and a warehouse layout map. This information may be stored in a warehouse logistics database that may either be stored within the warehouse premises or may be located in a server located outside the warehouse premises. Similarly, the warehouse management device 100 may be located within the warehouse or may be remotely located, thereby enabling a warehouse operator to manage warehouse task from a remote location. The warehouse management device 100 may also extract a warehouse task schedule from the warehouse logistics database.

The employee information associated with the plurality of employees may include one or more of, but is not limited to bibliographic information, employment record, and historical information associated with each employee. The bibliographic information and the employment record for an employee may include one or more of, but is not limited to name of the employee, age, sex, country of birth, date of joining, number of years in active job, educational background, fixed monthly or yearly salary, cost to company, hourly rates, employment contract, and designation. The historical information associated with an employee may include one or more of, but is not limited working efficiency, areas of expertise, health information, hours of experience in performing a particular task, fatal faults, errors, or mistakes, involvement in accidents within the warehouse, hours of experience in handling a particular type of vehicle or equipment, and different types of vehicles and equipment handled.

The vehicle information associated with the plurality of vehicles includes vehicle and equipment performance and statistical information, types of vehicles and equipment in the warehouse (for example, Burden Carrier, Stock Chaser, Personnel Carrier, Hand pallet trucks, Electric trucks, and Narrow aisle trucks), and number of each type of vehicle and equipment. The vehicle and equipment performance and statistical information may include one or more of, but is not limited to rated capacity, dimensions, loaded weight handling capacity, maintenance cost, fuel consumption rate, power required for operation, employees required for operation, skillset of the operators required, total number of hours of utilizations, the number and types of issues faced, resale value, and frequency of part replacement.

Further, the warehouse layout map includes information associated with floor plan of the warehouse, distance between regions within the warehouse, available and unavailable space within the warehouse, location of immovable and movable assets, location of cameras installed within the warehouse, and destination points for article storage in the warehouse. Camera feeds are also collected by the warehouse management device by communicating with the cameras installed within the warehouse.

The warehouse task schedule includes a list of different tasks assigned to different employees and vehicles or equipment within the warehouse. The warehouse task schedule further includes information pertaining to inbound and outbound articles and related logistics. Additionally, the warehouse task schedule includes priority associated with various tasks and a designated time frame for task completion.

In an embodiment, after extracting the above mentioned data, each of the employee information, the vehicle information, the warehouse layout map, the camera feeds, and the warehouse task schedule may be transformed into a predefined format at 304. This predefined format may be a common semi-structured format, which, for example, may include, but is not limited to text and video frames. By way of an example, camera feeds captured from the cameras may be converted into frames. By way of another example, employee information may be loaded in a database along with work schedule for monthly or daily basis. During data transformation, the extracted data is also categorized and correctly mapped with regions within the warehouse in order to enable accurate tracking of employees, vehicles, equipment, and articles, by using trajectory analysis.

Thereafter, at 306, the warehouse management device analyzes the camera feeds to determine current activity status of each employee and interaction of each employee with one or more vehicles and equipment. This further includes uniquely identifying, at 306*a*, an employee, a vehicle, an equipment, and an article present within the warehouse using image training data and pixel data captured from the camera feeds. This analysis of the camera feeds helps in determining current location of: each employee, each vehicle and equipment, and various articles within the warehouse.

The warehouse management device 100 also extracts different measurement parameters of the warehouse using this image training data and pixel data. This measurement parameters, for example, may include, but are not limited to line marker, passage length, and other structural information related to the warehouse.

The image training data aids in differentiating between employees, vehicles, equipment, and static structures within the warehouse. The warehouse management device has an image classification based algorithms, which is trained to make such differentiation and also identify all the features of vehicles, equipment, employees, and articles in the warehouse. The warehouse management device 100 also consolidates details associated with various images to gather information on complete assigned task within the warehouse. The consolidated data is stored in an image knowledge database in the form of image training data. By way of an example, for an employee carrying goods from the entry of the warehouse, the warehouse management device saves the features of employee in the image knowledge database.

The image knowledge database (which includes trained features of different entities in the warehouse) is then used to process a new image, classify it, and thereafter provide information on that new image using the image training data. By way of an example, the image knowledge database may be used to determine the number, identity and location of machines, vehicles, equipment, and articles present in a given image being processed. By way of another example, the image knowledge database may be used to determine movement of an employee from an initial assignment of task to the delivery along with features associated with the employee, such as, height, age, gender, and uniform based on multiple images captured. Additionally, vehicles may also be tracked by analyzing camera feeds, based on information on scheduled vehicles for specific tasks and image training data stored in the image knowledge database. By way of yet another example, activity and inactivity for an employee or an equipment/machine may be determined based on movement of blobs, color uniform movement of employee or vehicles/machines.

An image may also be analyzed to determine the loading and unloading of equipment and movement of them onto a machine or away from the machine. The machine may be a vehicle or an equipment. By way of an example, movement of a forklift or hand pallets towards the placement site or outside of the warehouse are captured by the pattern of movement of coordinates of blob images.

While analyzing video frames representing the camera feeds, the warehouse management device 100 discard data in these video frames which are not required for processing. By way of an example, for the camera feeds captured during night hours, the night videos may not show any activity at a particular location within the warehouse. In this case, video frames that are associated with such location are discarded by the warehouse management device.

After analyzing the camera feeds captured using the plurality of cameras, the warehouse management device 100 computes a task completion plan, at 308, for transporting an article from an originating point to a destination point within the warehouse. The task completion plan is computed based on: the employee information, the vehicle and equipment information, the warehouse layout map, and analysis of the camera feeds. The task completion plan includes a combination of one or more employees, one or more vehicles and equipment, a path within the warehouse for transporting the article, and priority associated with transporting the article.

The combination mentioned above selected, such that, transporting the article from the originating point to the destination point involves the least cost. This is further explained in detail in conjunction with FIG. 4.

Referring now to FIG. 4, a method for computing a task completion plan to transport an article within the warehouse is illustrated, in accordance with an embodiment. To compute the task completion plan, at 402, a plurality of paths within the warehouse are identified that can be used to transport the article from the originating point to the destination point. Each path connects the originating point to the destination point. These plurality of paths are identified using the warehouse layout map and the analysis performed on the camera feeds. Examples of different types of analysis that are performed on the camera feeds have been explained in detail in conjunction with FIG. 3.

The plurality of paths are dynamically identified as location and placement of various articles, vehicles, and equipment, keeps on changing. As a result, an employee has to be guided in real-time regarding the optimum path that should be taken for loading and unloading of an article. The warehouse layout map includes information on floor plan of the warehouse, distance between regions within the warehouse, available and unavailable spaces within the warehouse, location of immovable and movable assets within the warehouse. Using this information, along with the analysis performed on the camera feeds captured from the cameras installed within the warehouse, various measurement parameters, which may include, but are not limited to line marker and passage length are determined.

The analysis of camera feeds that determine current location of each employee, each vehicle and equipment, and various articles within the warehouse is also used to identify a plurality of paths. The plurality of paths thus identified are different paths within the warehouse that can be used by an employee or a vehicle to transport the article from its originating point to the destination point. However, the most optimum of these paths to be taken is based on several factors, some of which are discussed below.

One of the factors considered to decide an optimum path is whether a vehicle or an equipment would be able to move within space available between the articles lying in the warehouse. This decision is reached by using the floor plan retrieved from the warehouse layout map, the available space between various articles lying within the warehouse identified using the camera feeds, dimensions of the articles determined based on analysis of the camera feeds or pre-configured dimension information, and dimensions of various vehicles and equipment determined using the vehicle information extracted by the warehouse management device 100.

In an embodiment, the warehouse management device 100 may determine available space between various articles lying in the warehouse by first analyzing a warehouse image without any articles placed in the warehouse. Thereafter, as different articles are placed in the warehouse, the warehouse management device 100 marks the corresponding positions of article placement with background subtraction and blob images. Then the warehouse management device 100 determines the available space by determining pixels between two or more articles and calculating distance between them using equation 1 given below.

Based on the analysis discussed above, when it is determined that a particular path is not suitable for movement of a vehicle or an equipment because of space constraint between two or more articles, that particular path is considered blocked and marked unusable. This path is discarded for further analysis.

Thereafter, actual distance is computed for the plurality of paths, at 404, by converting pixel data associated with the plurality of paths captured from the camera feeds. Paths that had been marked unusable are not considered for actual distance computation. In an embodiment, using the actual distance computed for the plurality of paths, the shortest path amongst the plurality may be identified.

In an exemplary embodiment, each pixel in an image retrieved from the camera feeds corresponds to an actual distance in a unit of measurement, for example, centimeter, meter, or feet. The actual distance to reach from one point in the warehouse floor plan to another using pixels in an image, may be computed using equation 1 given below:

$$Y = mx + c \qquad (1)$$

where,
- 'Y' is the actual distance between two points for a given straight line path;
- 'm' is the slope of the given straight line path and would change with change in inclination of the path w.r.t a predefined axis;
- 'x' is the number of pixels between originating point and termination point of the straight line path, which is determined based on images captured from camera feeds;
- 'c' is the constant variable (which may be zero as well) that depends on the equation which is calculated with initial variables, when employee or vehicle is moving from the originating point to the destination point.

Equation 1 is used to compute actual distance for a static path. A static path may be a straight line path that does not involve any variation in the trajectory followed by an employee or vehicle. By way of an example, a straight line path has a slope (m) of 2, the value of the constant (c) is 1, and the pixel difference (x) in an image captured for a user or vehicle moving from originating point of the path to the end point is 7. In this case, the actual distance (Y) computed for the path would be: 2*7+1=15 cm.

In another exemplary embodiment, equation 2 may be used to compute the actual distance for a dynamic path. A dynamic path may be a combination of two or more static paths. In this case, pattern based leaning of vehicle and employee movement with respect to articles present within the warehouse is utilized.

$$Y = Y1 + Y2 \qquad (2)$$

where,
Y is the actual distance for the dynamic path that is a combination of two static paths
Y1 is the actual distance for the first static path and Y2 is the actual distance computed for the second static path using equation 1

In yet another example, if the path for which the actual distance needs to be determined is a curved path taken by an employee or a vehicle, then equation 3 may be used to compute the actual distance.

$$Y = mx^2 \qquad (3)$$

It will be apparent to a person skilled in the art that various combination and variations of algebraic equations (not discussed here) may be used to compute the actual distance using the pixel data.

Once actual distance for each of the plurality of paths has been computed, the warehouse management device 100 identifies, at 406, suitable employees and types of suitable vehicles or equipment that are required to transport the article from the originating point to the destination point. This identification is made using the employee information and the vehicle and equipment information gathered by the warehouse management device 100. Suitability of one or more employees and one or more vehicles to transport an article may be determined based on handling description (for example, fragile articles, temperature restrictions or requirements etc), dimension, and weight of that article and based on warehouse task schedule.

An employee's suitability would be established based on the employee information and priority associated with the task, which is determined using the warehouse task schedule. The relevant employee information in this case, may include experience of an employee in handling a particular type of task, hourly rates, designation, working efficiency, areas of expertise, number of hours of experience in handling a particular type of vehicle or equipment, fatal mistakes made by the employee, and involvement in accidents within a warehouse while doing a similar task.

Similarly, suitability of a vehicle to transport the article may be determined based on vehicle information, which in this case, may include vehicle dimensions, loaded weight handling capacity, maintenance cost, fuel consumption rate, employees required to operate the vehicle or equipment, and skillset of the operators. By way of an example, a given task requires transporting a load weighing 100 kgs. The warehouse management device 100 may determine three ways of completing this task. First, 2 forklift trucks having a capacity of 50 kgs each will be required to complete the task with 2 employees required to operate the forklift trucks. Second, four pallet trucks each having a capacity of 25 kgs and 4 employees to operate these pallet trucks. Last, one pallet trucks to be used 4 times and requiring a single employee doing four such rounds.

This decision may also be based on priority associated with the task. Higher the priority assigned to a task in the warehouse task schedule, more will be the number of resources allotted for prompt completion of the task.

Thereafter, at 408, the warehouse management device 100 computes cost associated with each of a plurality of volume combinations. Each volume combination includes the number of suitable employees, a type of suitable vehicle, total number of the type of suitable vehicle, and time required by a suitable employee to operate the type of suitable vehicle or equipment. The information included in each of the plurality of volume combinations was identified at 406. In an exemplary embodiment, cost for a volume combination is computed using equation 3 given below:

$$VC = F \text{ (Cost for total number of suitable employees)} + F \text{ (Cost for total number of suitable vehicles)} + F \text{ (Time required by a suitable employee to operate a suitable vehicle or equipment)} \qquad (3)$$

where,
VC is the cost computed for a volume combination

After cost is computed for each volume combination using equation 3 given above, the warehouse management device 100 identifies a volume combination from the plurality of volume combinations that requires the least cost at

410. In an embodiment, when a high priority is assigned to a task and the task needs to be completed in a designated time frame, that volume combination would be identified, which meets the designated time frame criteria and has the least cost amongst those volume combinations that meet the designated time frame criteria. In continuation of the example given above, the last volume combination that requires one pallet truck (with load capacity of 25 kgs) and one employee doing four rounds of that pallet truck to transport the 100 kg load has the least cost. Also, this volume combination transports the load in within the designated time frame. As a result, this is the volume combination that is identified.

At 412, the warehouse management device 100 computes time required to transport the article from the originating point to the destination point for each of the plurality of paths that were identified at 402. The time required to transport the article is computed based on the actual distance computed for each of the plurality of paths, the areas within the warehouse experiencing modification in traffic flow, and the volume combination identified at 410.

The areas within the warehouse that are experiencing modification in traffic flow are identified based on the analysis performed on the camera feeds captured using the plurality of cameras. The modification in traffic flow may include creation of traffic congestion and/or clearing of traffic congestion that was present earlier.

The camera feeds are analyzed to detect traffic movement by tracking movement of various vehicles, equipment, and employees in different areas or regions of the warehouse and marking those areas or regions as occupied because of performance of some task in those areas or regions. The warehouse management device 100 uses a predefined set of inbuilt rules to understand the loading and unloading of vehicles or equipment, identify different articles, and detect movement of these articles onto or away from the vehicles or equipment. By way of an example, movement of forklift or hand pallets towards a destination point or outside the warehouse is captured using the pattern of movement of coordinates of blob images. Similarly, activity/inactivity is detected using movement of blobs, color uniform movement of employee or vehicles/equipment.

The warehouse management device 100 also maps employee movement from the initial assignment of task to the delivery using unique features associated with an employee, for example, height, age, gender, and uniform. Additionally, vehicles are also tracked using information related to vehicles schedule for a specific task, retrieved from the warehouse task schedule. The combination of this information enables the warehouse management device 100 to detect traffic congestion in a particular area or region of the warehouse.

After identifying employees and vehicles, the warehouse management device 100 also keeps a record of time taken by an employee and a vehicle to load and unload an article. Based on efficiency of vehicles and employee, there would be different time logs for each employee and each vehicle. The information regarding traffic congestions and the above discussed information enables computation of the time required to transport an article from its originating point to its destination point. In an exemplary embodiment, time required to transport the article from the originating point to the destination point for each of the plurality of paths is computed using equation 4 given below:

Time associated with a path=$F$ (Actual distance computed for the Path)+$F$ (Current traffic congestion condition for the Path)+$F$ (Efficiency of suitable employee(s) and Vehicle(s) in the identified volume combination)  (4)

Thus, time that is required to transport the article form the originating point to the destination point is calculated for each of the plurality of paths identified at 402, using the identified volume combination. Thereafter, at 414, the warehouse management device 100 computes fuel consumption associated with each of the plurality of paths. This is computed using the actual distance computed for each of the plurality of paths, time required to transport the article on each of the plurality of paths, and the vehicle combination identified.

Computation of fuel consumption also takes into consideration, the wait time of vehicle at areas of traffic congestion. Additionally, switching on/off of a vehicle, when a driver abandons the vehicle for a break time or when the driver encounters traffic congestion increases the overall fuel consumption. The warehouse management device 100 would have access to an online knowledge base to provide the result in user defined unit of fuel consumption. In an exemplary embodiment, fuel consumption for a given path and the identified volume combination may be computed using equation 5 given below:

Fuel Consumption=$F$ (Actual distance computed for a Path)+$F$ (Waiting time for suitable vehicle(s) in the identified volume combination)+$F$ (average number of switch "off/on" of the suitable vehicle(s))  (5)

Once the fuel consumption values have been computed for each of the plurality of paths as discussed above, the warehouse management device 100 identifies, at 416, a path from the plurality of paths that requires the least fuel consumption to transport the article from the originating point to the destination point for the identified volume combination.

Thereafter, based on the cost computed for the volume combination identified (identified at 410), cost of fuel required to transport the article using the path (identified at 416), the employee information, and the vehicle information, the warehouse management device, 100 at 418, calculates the cost of transporting the article from the originating point to the destination point. In an exemplary embodiment, cost for completion of a task for a given path and identified volume combination may be computed using equation 6 given below:

$TC$=Cost computed for the identified volume combination+Fuel consumption cost for the path when the identified volume combination is used+$F$ (Maintenance cost of suitable vehicle (s))  (6)

where,

TC is cost for completion of a task.

Thus, the path and the volume combination identified by the warehouse management device 100, along with the total cost of transporting the article from the originating point to the destination point using the identified path and the volume combination is shared with users. In others words, the warehouse management device 100 enables selection of the most cost effective path, employee, and vehicle combination for loading/unloading goods within the warehouse.

The method includes identifying suitable employees and vehicles and the most cost effective traversal path for vehicles in the warehouse in order to make warehouse operations more efficient. The decisions on identifying the traversal path is influenced by proper monitoring of the warehouse using analysis performed on live camera feeds captured by cameras installed within the warehouse. The method correlates live traffic information thus captured with various cost combinations of labor and vehicle/equipment, to suggest a cost effective path and employee-vehicle combination for completion of a task. Thus, the warehouse management becomes more efficient resulting in a huge time and cost saving. Moreover, as the system is self-learning, its performance keeps on improving over a period of time.

Figure 5:
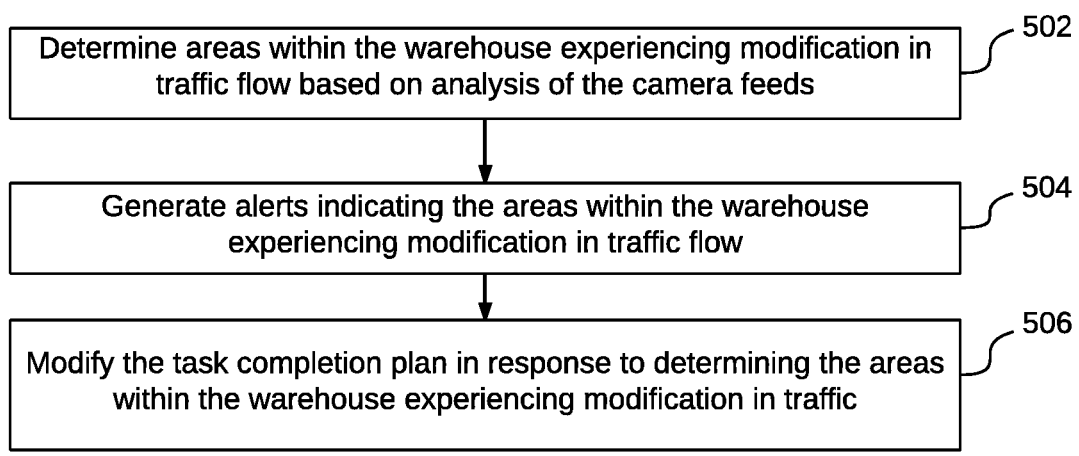
FIG. 5 illustrates a flowchart of a method for modifying the task completion plan based on modification of traffic flow within the warehouse, in accordance with an embodiment.

Referring now to FIG. 5, a flowchart of a method for modifying a task completion plan based on modification of traffic flow within the warehouse is illustrated, in accordance with an embodiment. At 502, the warehouse management device 100 determines areas within the warehouse that are experiencing modification in traffic flow. Modification in traffic flow may include creation of traffic congestion or clearing of an existing traffic congestion in these areas. To this end, the warehouse management device 100 analyzes the live camera feeds captured by the plurality of cameras installed in the warehouse in order to detect these traffic flow modifications in real time. This has been discussed in detail in conjunction with FIG. 4.

In response to determining this modification, the warehouse management device 100 generates alerts at 504. These alerts include an indication regarding the areas that are experiencing modification in traffic flow. Based on these alerts, the warehouse management device 100 modifies the task completion plan, at 506, based on the areas determined within the warehouse that are experiencing modification in traffic flow. Modification of task completion plan would involve performing steps 402 to 418 from the start. In other words, all task assigned to the areas identified in the alerts, are revaluated using the cost calculation method discussed in detail in FIG. 4. All these tasks may then be rescheduled to accommodate the modification in traffic flow. In other words, these tasks are assigned a different course of action depending on the wait time for traffic congestion to clear out.

Various embodiments of the invention provide systems and methods for transporting articles within warehouses using video analytics. The method includes identifying suitable employees and vehicles and the most cost effective traversal path for vehicles in the warehouse in order to make warehouse operations more efficient. The decisions on identifying the traversal path is influenced by proper monitoring of the warehouse using analysis performed on live camera feeds captured by cameras installed within the warehouse. The method correlates live traffic information thus captured with various cost combinations of labor and vehicle/equipment, to suggest a cost effective path and employee or vehicle or a combination thereof for completion of a task. Thus, the warehouse management becomes more efficient resulting in a huge time and cost saving. Moreover, as the system is self-learning, its performance keeps on improving over a period of time.

The specification has described systems and methods for transporting articles within warehouses using video analytics. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for facilitating transportation of articles in a warehouse, the method comprising:

extracting, by a warehouse management device, employee information associated with a plurality of employees, vehicle information associated with a plurality of vehicles used in the warehouse, and a warehouse layout map;

analyzing, by the warehouse management device, camera feeds captured using a plurality of cameras installed within the warehouse to determine current activity status of each of the employees, interaction of each of the employees with at least one of the vehicles, and current location of the employees, the vehicles, and articles within the warehouse, wherein the analyzing the camera feeds comprises processing pixel data, by the warehouse management device, from the camera feeds to uniquely identify one or more of the employees, the vehicles, and the articles; and computing, by the warehouse management device, a task completion plan for transporting one of the articles from an originating point to a destination point within the warehouse based on the employee information, the vehicle information, the warehouse layout map, and analysis of the camera feeds, wherein the computing the task completion plan further comprises:

identifying a plurality of paths for transporting the article from the originating point to the destination point using the warehouse layout map and the analysis performed on the camera feeds;

eliminating any of the paths which are unusable based on a determination from processing the pixel data that a measured space between two or more of the articles along any of the paths is unsuitable for an associated one of the vehicles; and computing a distance for each of the paths which are usable by processing the pixel data associated each of the paths;

wherein the task completion plan comprises a combination of at least one of the employees, at least one of the vehicles, and the distance of one of the paths which are usable, and priority associated with transporting the article.

2. The method of claim 1, wherein the analyzing the camera feeds further comprises determining areas within the warehouse experiencing modification in traffic flow, wherein the modification in traffic flow comprises at least one of creation of traffic congestion or clearing of traffic congestion in the areas.

3. The method of claim 2 further comprising generating alerts indicating the areas within the warehouse experiencing modification in traffic flow.

4. The method of claim 2 further comprising modifying the task completion plan in response to determining the areas within the warehouse experiencing modification in traffic flow.

5. The method of claim 1 wherein the computing the task completion plan further comprises:
   identifying employees and types of vehicles for transporting the article;
   computing costs associated with each of a plurality of volume combinations of the number of employees, a type of vehicle, total number of the type of vehicle, and time required for operating the type of vehicle by an employee; and
   identifying a volume combination from the plurality of volume combinations requiring the least cost.

6. The method of claim 5, wherein the computing the task completion plan comprises:
   computing time required to transport the article from the originating point to the destination point for each of the plurality of paths based on the actual distance computed for each of the plurality of paths, the areas within the warehouse experiencing modification in traffic flow, and the volume combination identified.

7. The method of claim 6, wherein the computing the task completion plan comprises:
   computing fuel consumption associated with each of the plurality of paths based on the actual distance computed for each of the plurality of paths, time required to transport the article on each of the plurality of paths, and the vehicle combination identified; and
   identifying the path from the plurality of paths requiring least fuel consumption to transport the article from the originating point to the destination point.

8. The method of claim 7, wherein the computing the task completion plan further comprises:
   calculating the cost of transporting the article from the originating point to the destination point based on the cost computed for the volume combination identified, cost of fuel required to transport the article using the path, the employee information, and the vehicle information.

9. The method of claim 1 further comprising transforming the employee information, the vehicle information, the warehouse layout map, and the camera feeds into a predefined format.

10. The method of claim 1, wherein the the processing the pixel data further comprises executing an image classification algorithm trained using image training data and the pixel data captured from the camera feeds.

11. The method of claim 1, wherein the employee information comprises bibliographic, and historical information associated with the plurality of employees, the vehicle information comprises vehicle performance and statistical information associated with the plurality of vehicles, and the warehouse layout map comprises information associated with available and unavailable space within the warehouse, location of immovable and movable assets, and destination points for article storage in the warehouse.

12. A warehouse management device comprising:
   one or more processors; and
   a memory communicatively coupled to the one or more processors, wherein the memory stores processor executable instructions, which, on execution, causes the one or more processors to:
      extract employee information associated with a plurality of employees, vehicle information associated with a plurality of vehicles used in the warehouse, and a warehouse layout map;
      analyze camera feeds captured using a plurality of cameras installed within the warehouse to determine current activity status of each of the employees, interaction of each of the employees with at least one of the vehicles, and current location of the employees, the vehicles, and articles within the warehouse, wherein the analyze the camera feeds comprises processing pixel data from the camera feeds to uniquely identify one or more of the employees, the vehicles, and the articles; and
      compute a task completion plan for transporting an article from an originating point to a destination point within the warehouse based on the employee information, the vehicle information, the warehouse layout map, and analysis of the camera feeds, wherein the compute the task completion plan further comprises:
         identify a plurality of paths for transporting the article from the originating point to the destination point using the warehouse layout map and the analysis performed on the camera feeds;
         eliminate any of the paths which are unusable based on a determination from processing the pixel data that a measured space between two or more of the articles along any of the paths is unsuitable for an associated one of the vehicles; and
         compute a distance for each of the paths which are usable by processing the pixel data associated each of the paths;
      wherein the task completion plan comprises a combination of at least one of the employees, at least one of the vehicles, and the distance of one of the paths which are usable, and priority associated with transporting the article.

13. The warehouse management device of claim 12, wherein the analyze the camera feeds further comprises determine areas within the warehouse experiencing modification in traffic flow, wherein the modification in traffic flow comprises at least one of creation of traffic congestion or clearing of traffic congestion in the areas.

14. The warehouse management device of claim 13, wherein the memory stores the processor executable instructions, which, on execution, further cause the one or more processors to: modify the task completion plan in response to determining the areas within the warehouse experiencing modification in traffic flow.

15. The warehouse management device of claim 12, wherein the memory stores the processor executable instructions for the compute the task completion plan, which, on execution, further cause the one or more processors to:
   identify employees and types of vehicles for transporting the article;
   compute costs associated with each of a plurality of volume combinations of the number of employees, a type of suitable vehicle, total number of the type of vehicle, and time required for operating the type of vehicle by an employee; and identify a volume combination from the plurality of volume combinations requiring the least cost.

16. The warehouse management device of claim 15, wherein the memory stores the processor executable instructions for the compute the task completion plan, which, on execution, further cause the one or more processors to:

compute time required to transport the article from the originating point to the destination point for each of the plurality of paths based on the actual distance computed for each of the plurality of paths, the areas within the warehouse experiencing modification in traffic flow, and the volume combination identified.

17. The warehouse management device of claim 16, wherein the operation of computing the task completion plan comprises operations of:

computing fuel consumption associated with each of the plurality of paths based on the actual distance computed for each of the plurality of paths, time required to transport the article on each of the plurality of paths, and the vehicle combination identified; and identifying the path from the plurality of paths requiring least fuel consumption to transport the article from the originating point to the destination point.

18. The warehouse management device of claim 17, wherein the memory stores the processor executable instructions for the compute the task completion plan, which, on execution, further cause the one or more processors to:

calculate the cost of transporting the article from the originating point to the destination point based on the cost computed for the volume combination identified, cost of fuel required to transport the article using the path, the employee information, and the vehicle information.

19. A non-transitory computer-readable storage medium having stored thereon, a set of computer-executable instructions for facilitating transportation of articles within a warehouse, causing a computer comprising one or more processors to perform steps comprising:

extracting employee information associated with a plurality of employees, vehicle information associated with a plurality of vehicles used in the warehouse, and a warehouse layout map;

analyzing camera feeds captured using a plurality of cameras installed within the warehouse to determine current activity status of each of the employees, interaction of each of the employees with at least one of the vehicles, and current location of the employees, the vehicles, and articles within the warehouse, wherein the analyze the camera feeds comprises processing pixel data from the camera feeds to uniquely identify one or more of the employees, the vehicles, and the articles; and computing a task completion plan for transporting one of the articles from an originating point to a destination point within the warehouse based on the employee information, the vehicle information, the warehouse layout map, and analysis of the camera feeds, wherein the computing the task completion plan further comprises:

identifying a plurality of paths for transporting the article from the originating point to the destination point using the warehouse layout map and the analysis performed on the camera feeds;

eliminating any of the paths which are unusable based on a determination from processing the pixel data that a measured space between two or more of the articles along any of the paths is unsuitable for an associated one of the vehicles; and computing a distance for each of the paths which are usable by processing the pixel data associated each of the paths;

wherein the task completion plan comprises a combination of at least one of the employees, at least one of the vehicles, and the distance of one of the paths which are usable, and priority associated with transporting the article.

* * * * *